Patented Sept. 11, 1951

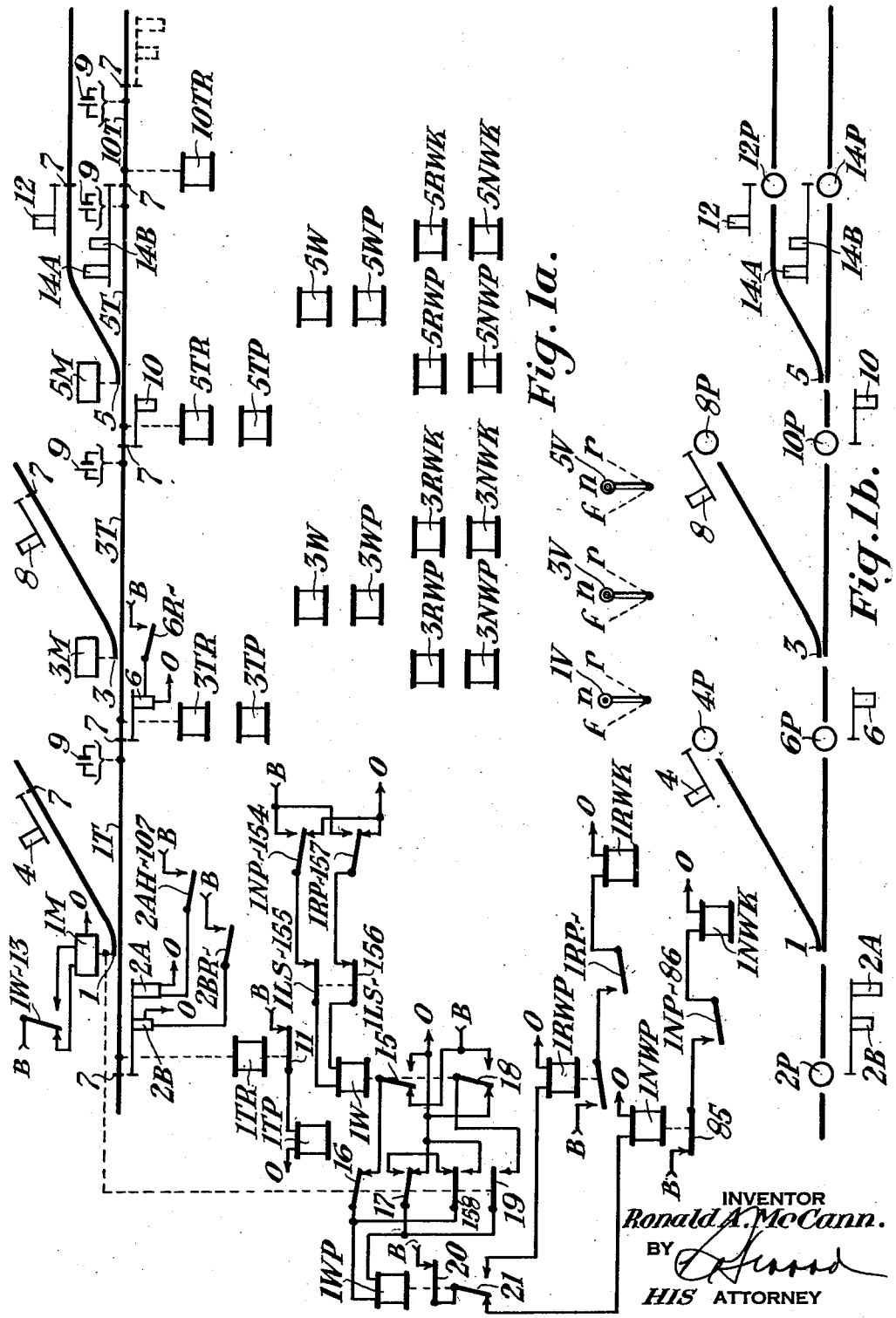

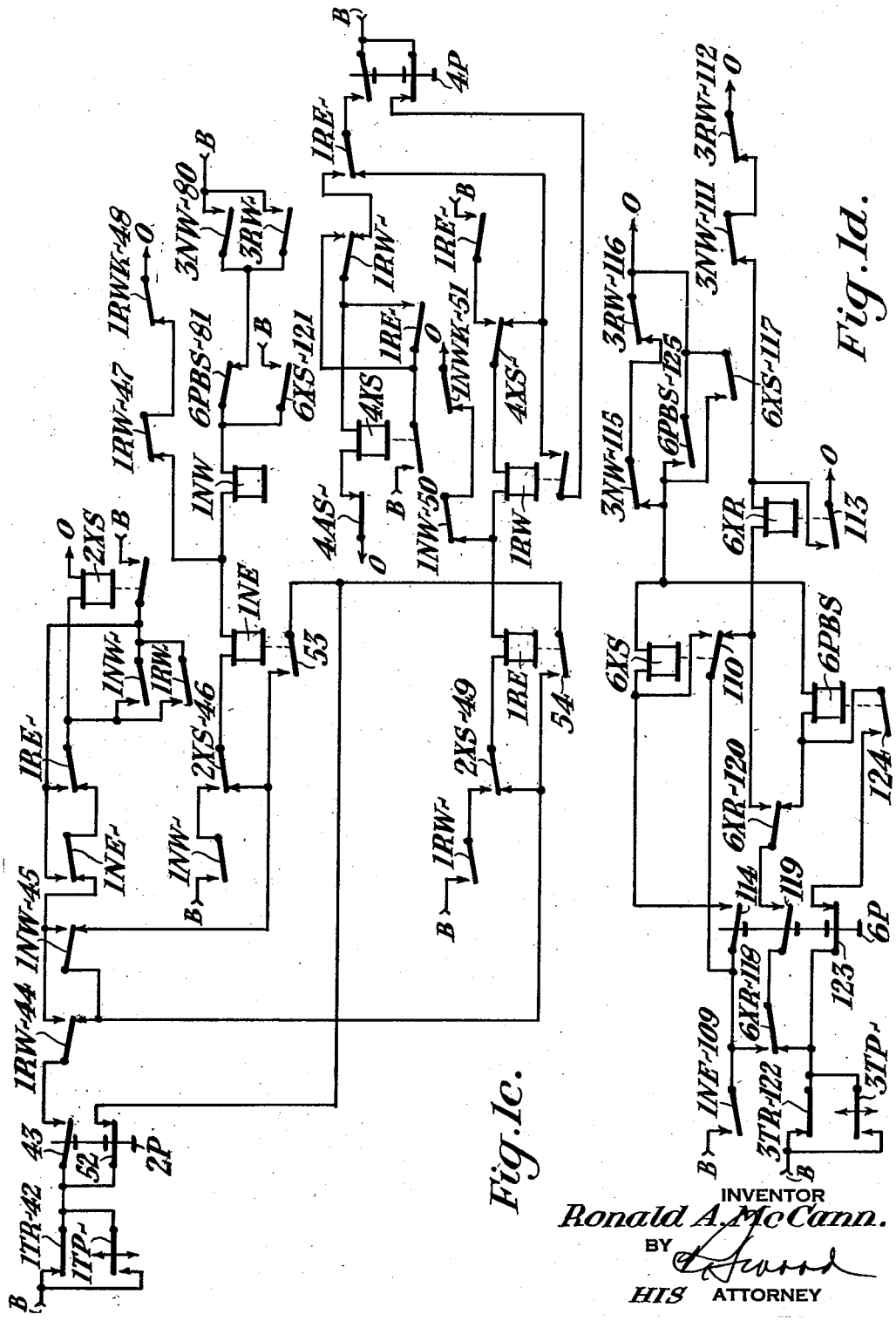

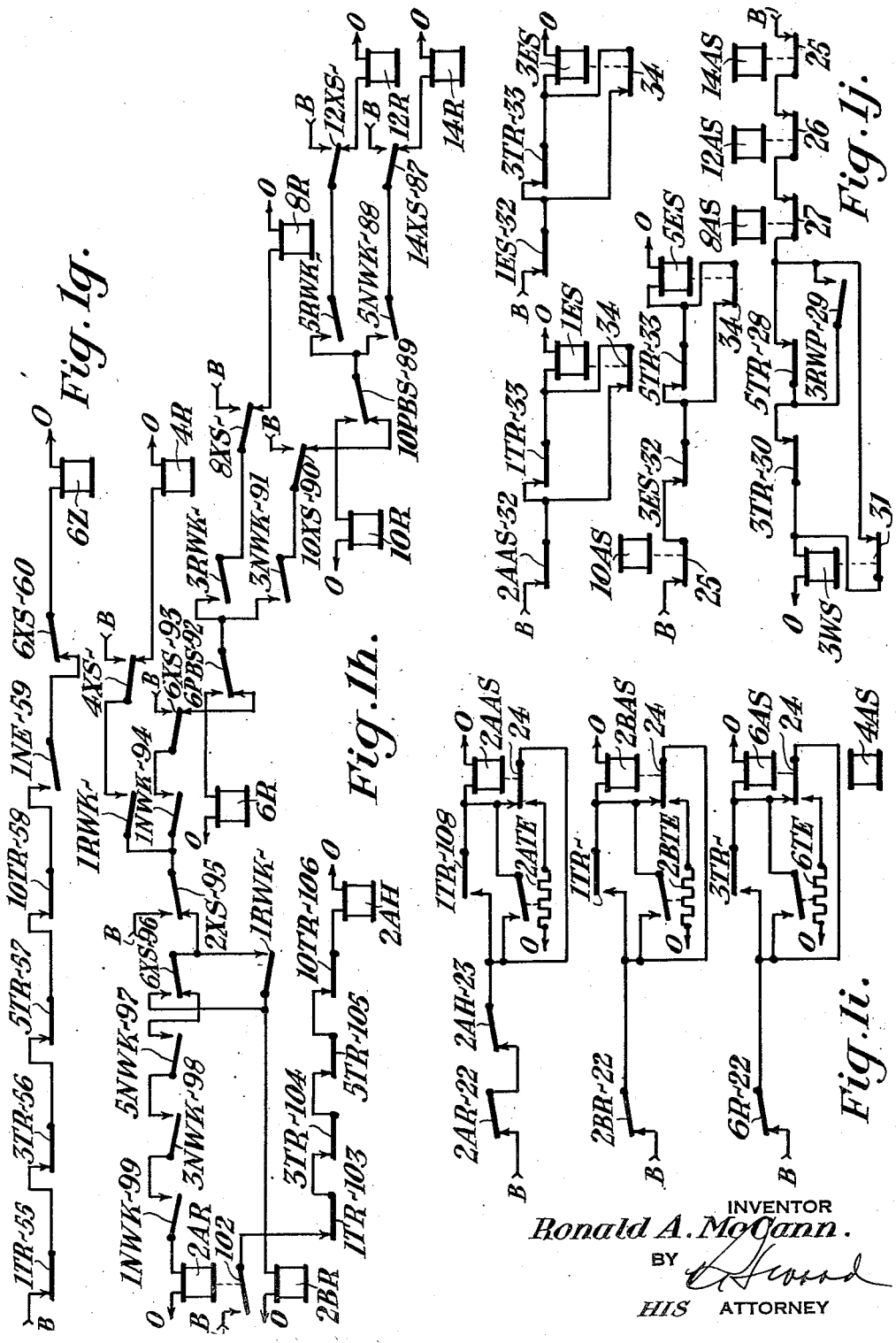

2,567,887

UNITED STATES PATENT OFFICE 2,567,887

ENTRANCE-EXIT ROUTE INTERLOCKING CONTROL APPARATUS

Ronald A. McCann, Swissvale, Pa., assignor to The Union Switch and Signal Company, Swissvale, Pa., a corporation of Pennsylvania Application September 18, 1946, Serial No. 697,704

18 Claims. (Cl. 246—134)

My invention relates to interlocking control apparatus, and particularly to interlocking control apparatus in which manual control devices, such for example as push buttons, are provided in a track model or diagram at points corresponding to signal locations, for effecting operation of the track switches and a signal for each route by operation of the manual control devices for the two ends of the corresponding route.

In an interlocking control system shown and described in Letters Patent of the United States No. 2,301,297 which was granted November 10, 1942 to Lloyd V. Lewis, for Railway Traffic Controlling Apparatus, the final route selector for any given route, as defined by lines 33 to 36, inclusive, in the first column on page 5 of that patent, includes the exit stick relay for the given route and all except the entrance stick relay of the preliminary route selector for the corresponding route for the opposite direction of traffic movements. For the route 4—12 referred to in that patent, the final route selector therefore does not include relay 7BNWS. The preliminary route selector for route 4—12 is defined by lines 1 to 5, inclusive, in the first column on page 4 of the patent.

One feature of my invention is the provision of means for including in the final route selector for each route all the switch selector relays of the preliminary route selector for the opposite direction of traffic movements. Because of this feature, no contacts of the exit stick relays are required for controlling the switch control relays.

Another feature of my invention is the use of contacts of the exit stick relays without contacts of switch selector relays for effecting directional control of the route agreement relays which correspond to the signal control relays shown in Fig. 1D of the patent referred to.

Because of these features, more economical use of relay contacts is provided, and hence fewer relays are required in apparatus embodying my invention.

A further feature of my invention is the provision of through-route control for high speed through traffic movements, and intermediate route control for low speed diverging, switching, or call-on traffic movements.

I shall describe one form of apparatus embodying my invention, and shall then point out the novel features thereof in claims.

Figure 1E:
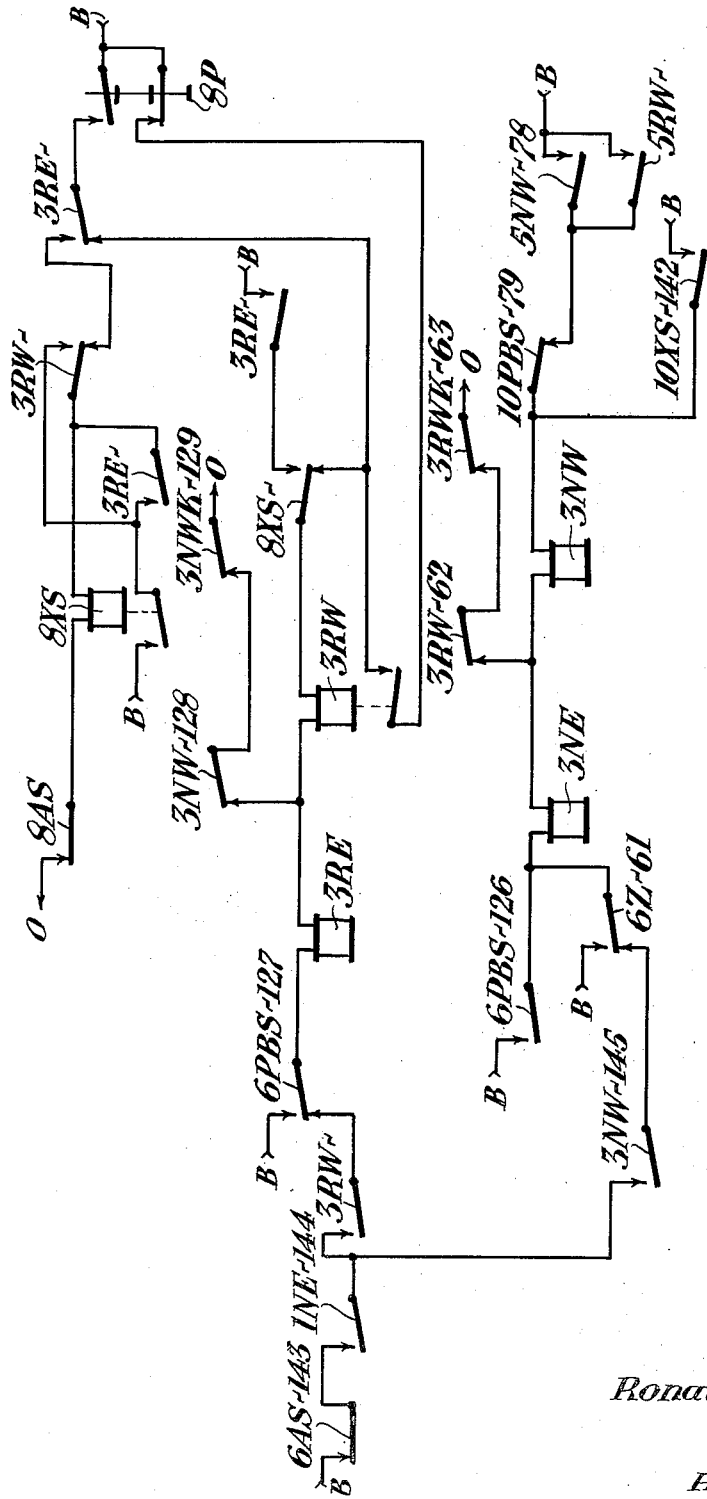
Figure 1F:
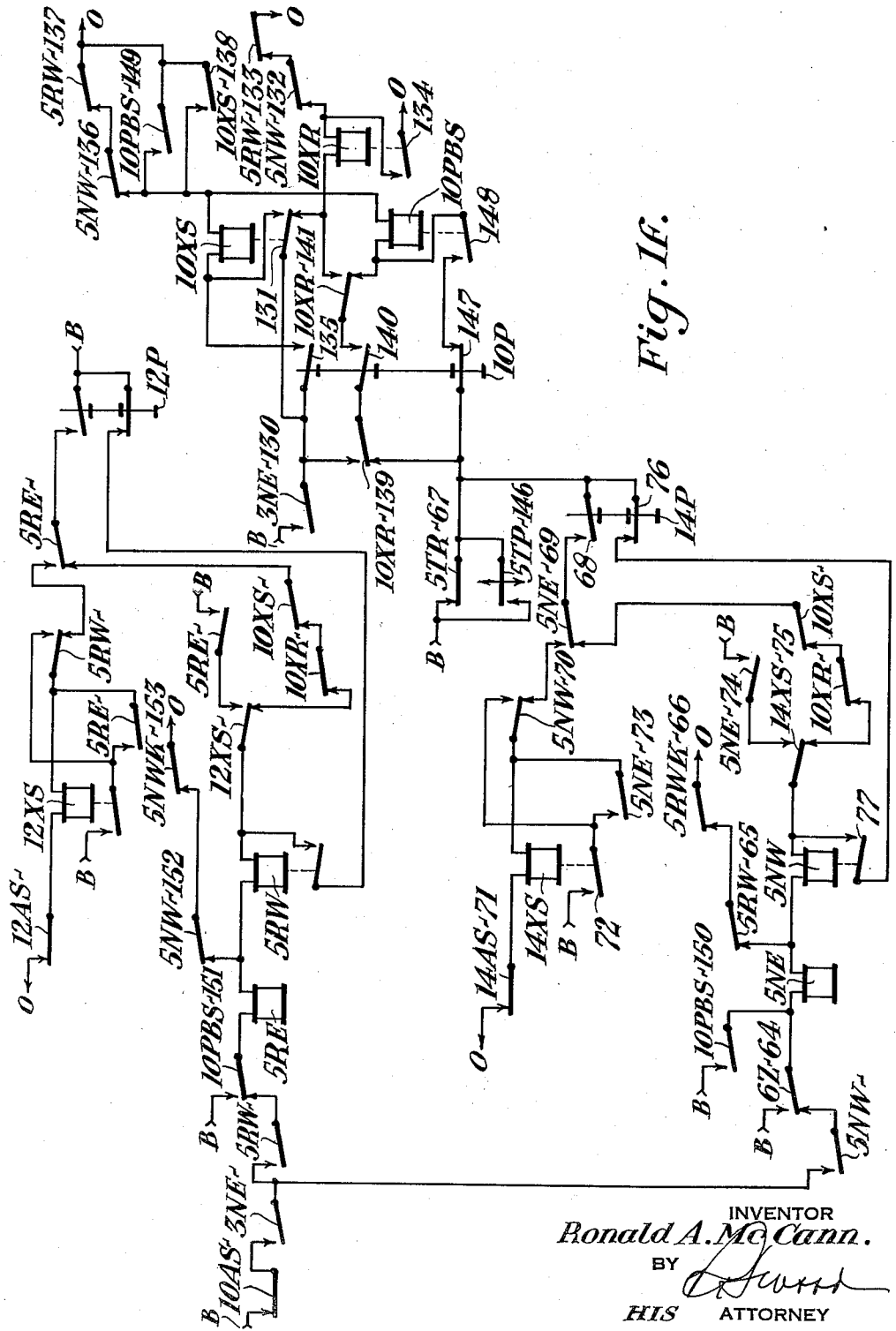
Figure 1K:
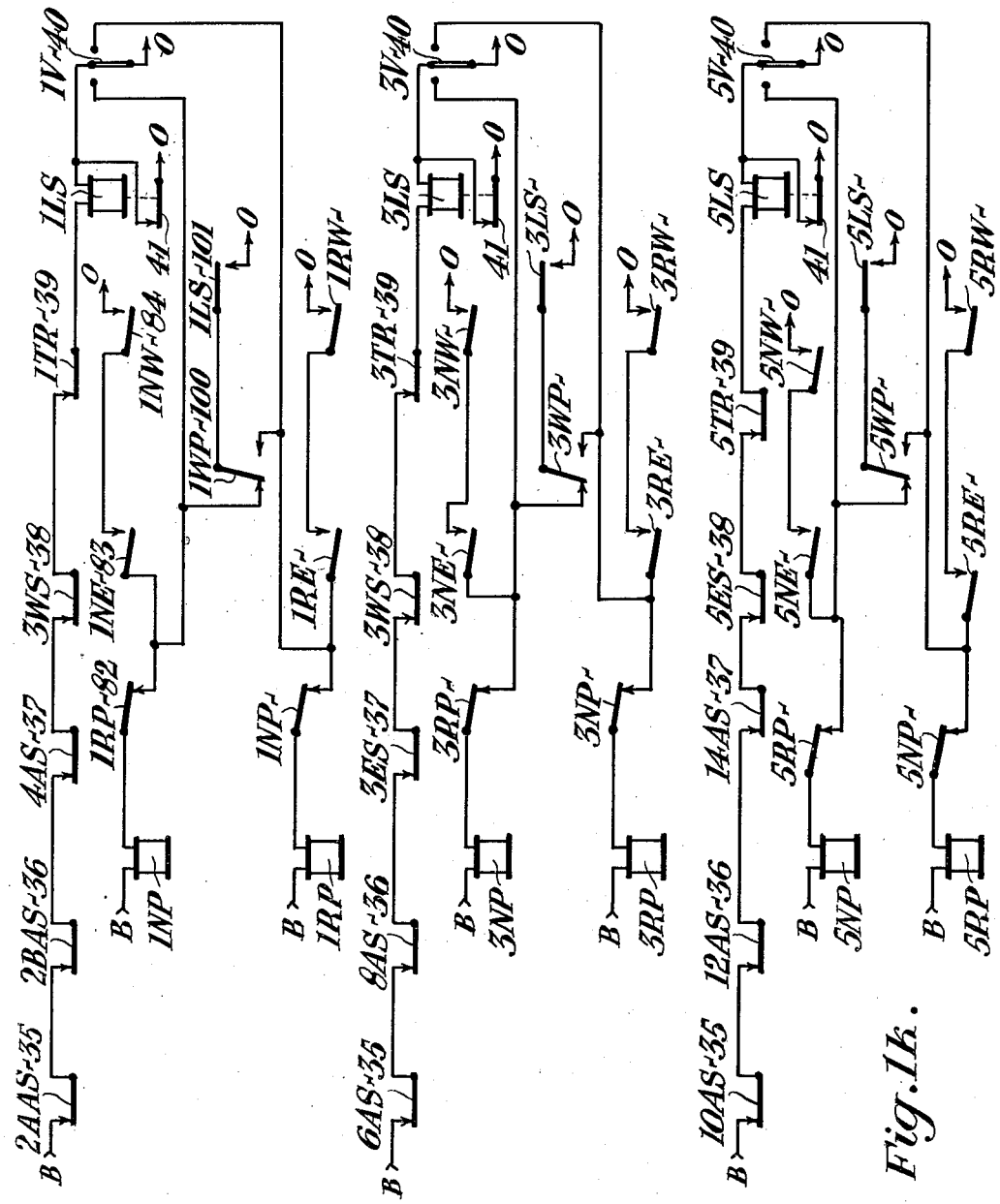

In the accompanying drawings, Figs. 1a to 1k, inclusive, are diagrammatic views showing one form of apparatus embodying my invention, in which Fig. 1a shows a layout of switches and signals in an interlocking plant, together with switch and signal operating circuits and switch indication circuits; Fig. 1b shows a track model or diagram, and shows manual route control push buttons arranged in the track model at points corresponding to the signal locations, and also shows individual levers for effecting separate operation of the switches; Figs. 1c, 1d, 1e and 1f show route selector circuits for the layout of Fig. 1a controlled by the manual control push buttons of Fig. 1b; Fig. 1g shows the circuit for controlling a through-route control relay; Fig. 1h shows route agreement relays controlled by switch indication relays and by intermediate route stick relays PBS, and also by main exit stick relays XS, but not by any of the switch selector relays; Fig. 1i shows control circuits for time locking relays; Fig. 1j shows control circuits for route locking relays; and Fig. 1k shows control circuits for normal and reverse switch control relays controlled by switch selector relays without the exit stick relays, and also shows control circuits for switch locking relays.

Similar reference characters refer to similar parts in each of the views.

In each of the views, the contacts operated by the various relays or other control devices are identified by numbers, each such number having a distinguishing prefix from which it is separated by a dash when the associated contact is shown apart from the relay or other device by which it is operated. The prefix for each of these contact numbers comprises the reference character for the relay or other device by which the associated contact is operated. For example, contact 2AH—107, shown adjacent the symbol for signal 2A in Fig. 1a, is identified by the number 107 separated by a dash from the prefix 2AH which is the reference character for relay 2AH by which this contact is operated. Some contacts shown in the drawings, but which are included only in circuits which are not traced in this specification, are identified by the reference character for the relay by which they are operated, followed by a dash, without a number after the dash. For example, contact 1RP— shown in the circuit for relay 1RWK in Fig. 1a, is identified by the reference character 1RP for relay 1RP by which this contact is operated, followed by only a dash.

Referring first to Fig. 1a, a track layout is shown including track switches designated by the reference characters 1, 3 and 5 which can be arranged in normal and reverse positions to form various routes. In order to simplify the drawing, each track, comprising two parallel series of track rails, is represented by a single line.

These tracks are divided by insulated joints 7 to form switch sections designated by the reference characters 1T, 3T, and 5T in which switches 1, 3 and 5, respectively, are located, and an approach section 10T. Each of these sections is provided with a track circuit including a suitable source of current such, for example, as a battery 9, connected across the rails adjacent one end of the section, and a track relay designated by the reference character 1TR, 3TR, 5TR or 10TR, respectively, connected across the rails adjacent the opposite end of the section.

Traffic movements in opposite directions over the track layout shown are governed by signals, designated by the reference characters 2A, 2B, 4, 6, 8, 10, 12, 14A and 14B, respectively. These signals may be of any suitable design such, for example, as the semaphore or the searchlight type. I shall assume that traffic movements toward the right, as shown in the drawing, are eastbound, whereas those in the opposite direction are westbound.

Track repeater relays 1TP, 3TP and 5TP, each having a slow pick-up and a slow release characteristic, are controlled by relays 1TR, 3TR and 5TR, respectively, as shown, for example, for relay 1TP.

Switches 1, 3 and 5 are operable to their normal positions in which they are shown in the drawing, and to the opposite or reverse positions by mechanisms designated by the reference characters 1M, 3M and 5M, respectively. Each of the mechanisms 1M, 3M and 5M is in turn controlled by a polarized switch control relay such, for example, as relay 1W, as shown controlling mechanism 1M.

Relay 1W is energized in the normal and the reverse direction by circuits controlled by a switch locking relay 1LS in the energized condition, and by normal and reverse switch control relays designated by the reference characters 1NP and 1RP, respectively.

A polarized switch indication relay 1WP is controlled by relay 1W and by contacts operated in conjunction with switch 1.

The contacts which are operated in conjunction with switch 1 are designated by the reference characters 16, 17, 158, and 19, respectively. These contacts are operated similarly to contacts 23 and 24 shown in a Patent No. 1,970,111, granted August 14, 1934 to James J. Vanhorn for Railway Switch Controlling Apparatus. Contacts 16, 17, 158, and 19 are operated in conjunction with switch 1 in such manner that contacts 158 and 19 are in the raised or front position, as shown in the drawing, at all times except when switch 1 is locked in its reverse position, and contacts 16 and 17 are in the raised or front position at all times except when switch 1 is locked in the normal position. Contacts 16 and 17 are in the lowered or back position, as shown in the drawing, only when switch 1 is in the normal position, and contacts 158 and 19 are in the lowered or back position only when switch 1 is in the reverse position.

Normal and reverse switch repeater relays 1NWP and 1RWP are controlled by a front contact and by normal and reverse contacts, respectively, of relay 1WP.

Normal and reverse switch indication relays 1NWK and 1RWK are in turn controlled by relays 1NWP and 1RWP, respectively, and by relays 1NP and 1RP, respectively. Switch control, indication, and repeater relays shown in the drawing for switches 3 and 5 are controlled similarly to the corresponding relays, as just described, for switch 1.

Through-route signal 2A is controlled by a circuit including a front contact of a signal relay 2AH. The circuit for energizing relay 2AH is shown in Fig. 1h. The other signals are controlled by corresponding route agreement relays as shown, for example, for signals 2B and 6.

Referring now to Fig. 1b, manual route control push buttons 2P, 4P, 6P, 8P, 10P, 12P and 14P are shown arranged in a track model or diagram adjacent representations of the corresponding signals. Individual switch levers 1V, 3V and 5V are also shown for effecting separate operation of switches 1, 3 and 5, respectively. Each of these switch levers has a normal position $n$, in which it is shown in the drawing, and also has a reverse position $f$ to the left, and a reverse position $r$ to the right.

Referring next to Figs. 1c, 1d, 1e and 1f, circuits are here shown for controlling intermediate route stick relays each of which is designated by a reference character comprising a number corresponding to that of an associated signal, followed by the letters PBS; for controlling main exit stick relays each of which is designated by the reference character XS preceded by a corresponding signal number; for controlling switch selector relays each of which is designated by a reference character comprising the letter N or R for normal or reverse switch position, respectively, followed by the letter E or W for eastbound or westbound route, respectively, and preceded by a number 1, 3 or 5 for switch 1, 3 or 5, respectively; and for controlling auxiliary exit stick relays designated by the reference character XR preceded by a numeral corresponding to that of an associated signal.

The circuits shown in Figs. 1c, 1d, 1e and 1f are controlled by the manual route control push buttons shown in Fig. 1b, each of which is designated by the reference character P preceded by the reference number for the signal for the corresponding route end. Each of these push buttons operates a circuit controller which is of the push-pull type such, for example, as shown in Letters Patent of the United States No. 2,295,301 granted September 8, 1942 to William E. Smith for Circuit Controllers. Each of these controllers is biased to a mid stroke position, and has a normally open contact and a normally closed contact such, for example, as contacts 43 and 52, respectively, of controller 2P shown at the left-hand end of Fig. 1c. Contact 43 becomes closed when button 2P is pushed in, and contact 52 becomes opened when button 2P is pulled out.

The circuits are so designed that operation of push buttons 2P and 14P will arrange a through route including switches 1, 3 and 5 in their normal positions, and will effect the clearing of signal 2A for directing traffic movements over this route. A type of signaling is used here, in which the intermediate signals 6 and 10 do not affect through traffic movements governed by signal 2A, and therefore signals 6 and 10 are left in the stop position while a through traffic movement governed by signal 2A is being made past these signals.

For arranging any other route or providing for a call-on traffic movement to be governed by signals 2B, 6 and 10 over the route on which traffic movements are normally governed by signal 2A, all the push buttons shown in the representation of such route in Fig. 1b must be operated, and the intermediate signals as well as the entering signal for such route will then be cleared. For example, in order to authorize a call-on traffic movement to be made over the route governed by signals 2B, 6 and 10, push buttons 2P and 6P must be operated for the first intermediate route from signal 2B to signal 6, then push buttons 6P and 10P must be operated for the second intermediate route from signal 6 to signal 10, and finally buttons 10P and 14P must be operated for the third intermediate route from signal 10 to signal 14. Signals 2B, 6 and 10 will then be cleared. Similarly, in order to arrange any of the diverging routes shown, such, for example, as the route which includes switch 5 reversed, push buttons 2P and 6P must be operated, then 6P and 10P, and finally 10P and 12P must be operated. After switch 5 has been reversed, signals 2B, 6 and 10 will be cleared.

In Fig. 1g, a circuit is shown for controlling a through route control relay 6Z.

In Fig. 1h, circuits are shown for controlling route agreement relays 2AR, 2BR, 4R, 6R, 8R, 10R, 12R and 14R. These circuits include contacts of the normal and reverse switch indication relays, and of the intermediate route stick relays, and also of the main exit stick relays, but do not include any contacts of the switch selector relays. A circuit for controlling signal relay 2AH is also shown in Fig. 1h.

In Fig. 1i, control circuits are shown for time locking stick relays 2AAS, 2BAS and 6AS, and for the associated time element devices 2ATE, 2BTE and 6TE, respectively. The time element devices may be of any suitable design such, for example, as the thermal type. Control circuits for time locking stick relays 4AS, 8AS, 10AS, 12AS and 14AS are similar to the circuits shown in Fig. 1i.

In Fig. 1j, control circuits are shown for route locking stick relays 1ES, 3ES, 5ES and 3WS.

Referring finally to Fig. 1k, the normal and reverse switch control relays are shown controlled by the switch selector relays without contacts of the exit stick relays. Circuits are also shown for controlling switch locking relays 1LS, 3LS and 5LS.

Having described, in general, the arrangement and control of the apparatus shown by the accompanying drawings, I shall now describe, in detail, its operation.

As shown by the drawings, all parts are in the normal condition, that is, switches 1, 3 and 5 are in their normal position; all signals are indicating stop; all track sections are unoccupied, and hence the track relays and track repeater relays are energized; each of the levers 1V, 3V and 5V is in its normal position n; the controllers operable by push buttons 2P, 4P, 6P, 8P, 10P, 12P and 14P are in their biased mid stroke position; relays 1NWP, 3NWP, 5NWP, the time and route locking relays shown in Figs. 1i and 1j, respectively, and relays 1LS, 3LS and 5LS are energized; relays 1WP, 3WP and 5WP are energized by current of normal polarity; and relays 1W, 3W, 5W, 1RWP, 3RWP, 5RWP, 1NWK, 3NWK, 5NWK, 1RWK, 3RWK, 5RWK, 6PBS, 10PBS, 6XR, 10XR, the route selector relays including the switch selector relays and the exit stick relays shown in Figs. 1c, 1d, 1e and 1f, relays 6Z and 2AH, the route agreement relays shown in Fig. 1h, and the normal and reverse switch control relays shown in Fig. 1k are deenergized.

The circuit by which relay 1TP is energized passes from terminal B of a suitable source of current, through contact 11 of relay 1TR, and winding of relay 1TP to terminal O of the same source of current. Contact 1W—13 is closed in the left-hand position in a circuit for energizing mechanism 1M, this circuit passing from terminal B, through contact 1W—13 in the left-hand position, and mechanism 1M to terminal O. Relay 1WP is energized by current of normal polarity in a circuit passing from terminal B, through contact 15 of relay 1W closed in the left-hand, or normal, position, contact 16 operated in conjunction with mechanism 1M, winding of relay 1WP, and contact 17 operated in conjunction with mechanism 1M to terminal O. The circuit by which relay 1NWP is energized passes from terminal B, through contact 20 of relay 1WP, contact 21 of relay 1WP closed in the left-hand position, and the winding of relay 1NWP to terminal O.

Relay 2AAS, shown in Fig. 1i, is energized by a stick circuit passing from terminal B, through contacts 2AR—22 and 2AH—23, front point of contact 24 of relay 2AAS, and the winding of relay 2AAS to terminal O. Relay 2BAS is energized by a stick circuit passing from terminal B, through contact 2BR—22, front point of contact 24 of relay 2BAS, and the winding of relay 2BAS to terminal O. Relay 6AS is energized by a stick circuit which is similar to the one just traced for relay 2BAS.

Both a pick-up and a stick circuit are closed for energizing relay 3WS shown in Fig. 1j, the pick-up circuit passing from terminal B, through contacts 25, 26 and 27 of relays 14AS, 12AS and 8AS, respectively, contact 5TR—28, contact 3TR—30, and the winding of relay 3WS to terminal O. The stick circuit passes from terminal B, through contacts 25, 26 and 27 of relays 14AS, 12AS and 8AS, respectively, contact 31 of relay 3WS, and the winding of relay 3WS to terminal O. Both a pick-up and a stick circuit are also closed for energizing each of the other route locking relays, the pick-up circuit for relay 5ES passing from terminal B, through contact 25 of relay 10AS, contact 3ES—32, contact 5TR—33, and the winding of relay 5ES to terminal O. The stick circuit is the same as the pick-up circuit just traced except that it includes contact 34 of relay 5ES instead of contact 5TR—33. The pick-up and stick circuits for relays 1ES and 3ES are similar to the circuits just traced for relay 5ES.

Both a pick-up and a stick circuit are closed for energizing relay 1LS shown in Fig. 1k, the pick-up circuit passing from terminal B, through contacts 2AAS—35, 2BAS—36, 4AS—37, 3WS—38 and 1TR—39, winding of relay 1LS, and contact 1V—40 to terminal O. The stick circuit for relay 1LS is the same as the pick-up circuit just traced except that it includes contact 41 of relay 1LS instead of contact 1V—40. Relays 3LS and 5LS are energized by circuits which are similar to the circuits just traced for relay 1LS.

I shall assume that a leverman desires to arrange the through route governed by signal 2A. He will, therefore, depress push button 2P, closing a circuit for energizing relay 1NE shown in Fig. 1c, this circuit passing from terminal B, through contact 1TR—42, contact 43 operated by button 2P, back point of contact 1RW—44, back point of contact 1NW—45, back point of contact 2XS—46, winding of relay 1NE, and contacts IRW—47 and IRWK—48 to terminal O. Relay INE, upon becoming energized, closes its own stick circuit passing from terminal B, through contact ITR—42, contact 52 of button 2P, contact 53 of relay INE, back point of contact 2XS—46, winding of relay INE, and contacts IRW—47 and IRWK—48 to terminal O.

A circuit for energizing relay IRE is also closed by operation of push button 2P, this circuit passing from terminal B, through contact ITR—42, contact 43 of relay 2P, back point of contact IRW—44, back point of contact 2XS—49, winding of relay IRE, and contacts INW—50 and INWK—51 to terminal O. A stick circuit is also closed for energizing relay IRE when relay IRE becomes energized, this circuit passing from terminal B, through contact ITR—42, contact 52 of push button 2P, contact 54 of relay IRE, back point of contact 2XS—49, winding of relay IRE, and contacts INW—50 and INWK—51 to terminal O.

Relay INE, upon becoming energized, closes a circuit for energizing relay 6Z shown in Fig. 1g, this circuit passing from terminal B, through contacts ITR—55, 3TR—56, 5TR—57, 10TR—58, INE—59, 6XS—60, and the winding of relay 6Z to terminal O.

Relay 6Z, upon becoming energized, completes a circuit for energizing relay 3NE, Fig. 1e, this circuit passing from terminal B, through the front point of contact 6Z—61, winding of relay 3NE, and contacts 3RW—62 and 3RWK—63 to terminal O. Relay 6Z, upon becoming energized, also completes a circuit for energizing relay 5NE, Fig. 1f, this circuit passing from terminal B, through the front point of contact 6Z—64, winding of relay 5NE, and contacts 5RW—65 and 5RWK—66 to terminal O.

The leverman will then depress push button 14P, Fig. 1f, thereby completing a pick-up circuit for energizing relay 14XS, this circuit passing from terminal B, through contact 5TR—67, contact 68 of button 14P, front point of contact 5NE—69, back point of contact 5NW—70, winding of relay 14XS, and contact 14AS—71 to terminal O. Relay 14XS, upon becoming energized, completes its stick circuit passing from terminal B, through contact 72 of relay 14XS, contact 5NE—73, winding of relay 14XS, and contact 14AS—71 to terminal O.

Relay 14XS, upon becoming energized, completes a pick-up circuit for energizing relay 5NW, this circuit passing from terminal B, through contact 5NE—74, front point of contact 14XS—75, winding of relay 5NW, and contacts 5RW—65 and 5RWK—66 to terminal O. Relay 5NW, upon becoming energized, completes its own stick circuit passing from terminal B, through contact 5TR—67, contact 76 or push button 14P, contact 77 of relay 5NW, winding of relay 5NW, and contacts 5RW—65 and 5RWK—66 to terminal O.

With relay 5NW energized, a second stick circuit is completed for relay 14XS, which is the same as the stick circuit previously traced for this relay except that it includes the front point of contact 5NW—70 instead of contact 5NE—73.

Relay 5NW, upon becoming energized, completes a circuit for energizing relay 3NW, this circuit passing from terminal B, through contact 5NW—78, contact 10PBS—79, winding of relay 3NW, and contacts 3RW—62 and 3RWK—63 to terminal O. Relay 3NW, upon becoming energized, in turn completes a circuit for energizing relay INW, this circuit passing from terminal B, through contacts 3NW—80 and 6PBS—81, winding of relay INW, and contacts IRW—47 and IRWK—48 to terminal O. Relay INW, upon becoming energized, opens its contact INW—50 in the pick-up and stick circuits for relay IRE, thereby causing relay IRE to become deenergized.

It follows that, in apparatus embodying my invention, the first route control push button operated for a route marks the entrance end of the route, and effects the energization of a preliminary route selector which comprises a first switch selector relay for each switch in the route in the position required for the route. For example, for the through route governed by signal 2A, the preliminary route selector comprises the first switch selector relays INE, 3NE and 5NE. Subsequent operation of the route control push button for the opposite or exit end of the route effects the energization of a final route selector which comprises an exit stick relay for the route and a second switch selector relay for each switch in the route in the position required for the route. For example, for the through route governed by signal 2A, the final route selector comprises the exit stick relay 14XS and all the second switch selector relays 5NW, 3NW and INW.

For the opposite direction of traffic movements over the same route, the preliminary route selector comprises the second switch selector relays 5NW, 3NW and INW, and the final route selector comprises the exit stick relay 2XS and all the first switch selector relays INE, 3NE and 5NE.

It will be seen, therefore, that the final route selector for each route comprises all the switch selector relays of the preliminary route selector for the opposite direction of traffic movements.

With relays INE and INW energized, a circuit shown in Fig. 1k is completed for energizing relay INP, this circuit passing from terminal B, through the winding of relay INP, and contacts IRP—82, INE—83, and INW—84 to terminal O. Relays 3NP and 5NP become energized by similar circuits also shown in Fig. 1k.

Relay INP, upon becoming energized, completes a circuit for energizing relay IW by current of normal polarity as shown in Fig. 1a, this circuit passing from terminal B, through the front point of contact INP—154, contacts ILS—155, winding of relay IW, contact ILS—156, and the back point of contact IRP—157 to terminal O. Since the contacts of relay IW are already in the normal position, they will not change when relay IW becomes energized by the circuit just traced. Relays IWP and INWP will therefore remain energized by their circuits previously traced.

Relay INWK, however, now becomes energized by a circuit passing from terminal B, through contact 85 of relay INWP, contact INP—86, and the winding of relay INWK to terminal O. With relays 3NP and 5NP also energized, relays 3NWK and 5NWK will become energized by circuits similar to those just traced for relay INWK.

A route agreement relay 2AR, shown in Fig. 1h, will now become energized by a circuit passing from terminal B, through the front point of contact 14XS—87, contact 5NWK—88, back points of contacts 10PBS—89 and 10XS—90, contact 3NWK—91, back points of contacts 6PBS—92 and 6XS—93, contact INWK—94, back points of contacts 2XS—95 and 6XS—96, contacts 5NWK—97, 3NWK—98 and INWK—99, and the winding of relay 2AR to terminal O. Relay 2AR, upon becoming energized, opens its contact 2AR—22 in the stick circuit traced for relay 2AAS in Fig. 1i, causing relay 2AAS to become deenergized.

Upon deenergization of relay 2AAS, its contact 2AAS—35 in the circuits traced in Fig. 1k for relay 1LS will become opened, thereby deenergizing relay 1LS. The circuits for relay 1ES, shown in Fig. 1j, will also become deenergized because of the opening of contact 2AAS—32. Relay 3ES will then be deenergized because contact 1ES—32 will be opened, and relay 5ES will be deenergized because contact 3ES—32 will be opened. The deenergization of relay 3ES also opens its contact 3ES—37 in the circuits for relay 3LS shown in Fig. 1k, and hence relay 3LS will be deenergized. Likewise, deenergization of relay 5ES opens contact 5ES—38 in the circuits shown for relay 5LS, causing relay 5LS to also be deenergized.

With relay 1LS deenergized, a normal retaining circuit for relay 1NP becomes closed, passing from terminal B, through the winding of relay 1NP, contact 1RP—82, contact 1WP—100 closed in the left-hand position, and contact 1LS—101 to terminal O. Relays 3LS and 5LS, upon becoming deenergized as described, complete normal retaining circuits for relays 3NP and 5NP which are similar to the circuit just traced for relay 1NP through contact 1LS—101.

With relay 2AR energized, relay 2AH, shown in Fig. 1h, becomes energized by a circuit passing from terminal B, through contact 102 of relay 2AR, contacts 1TR—103, 3TR—104, 5TR—105 and 10TR—106, and the winding of relay 2AH to terminal O. Signal 2A will now be cleared by a circuit passing from terminal B, through contact 2AH—107, and the mechanism of signal 2A to terminal O. Signal 2A, upon becoming thus operated, will authorize a through traffic movement past signals 6 and 10 in their stop position.

When a train passes signal 2A, relay 1TR will become deenergized, and hence its contact 1TR—103 will open the circuit previously traced for relay 2AH, causing this relay to become deenergized and thereby causing the arm of signal 2A to return to the stop position. Relay 1NE will also become deenergized because contact 1TR—42 will open.

The circuit for relay 6Z will also be open at contact 1TR—55. With relay 6Z deenergized, the circuit previously traced for relay 3NE will be open at contact 6Z—61, and the circuit previously traced for relay 5NE will be open at the front point of contact 6Z—64, and hence relays 3NE and 5NE will be deenergized. With relay 5NE deenergized, the pick-up circuit traced for relay 5NW will be opened at contact 5NE—74, but relay 5NW will remain energized by its stick circuit until the train enters section 5T and thereby deenergizes relay 5TR, causing contact 5TR—67 to become opened. With relay 5NW as well as relay 5NE then deenergized, the stick circuits previously traced for relay 14XS will be opened at contacts 5NE—73 and 5NW—70, respectively, causing relay 14XS to be deenergized. With relay 14XS deenergized, contact 14XS—87 will open the circuit previously traced for relay 2AR. Relay 3NW will now be deenergized because of the opening of contact 5NW—78, and relay 1NW will then be deenergized by the opening of contact 3NW—80.

When the train enters section 1T, deenergizing relay 1TR, relay 2AAS becomes energized by a pick-up circuit passing from terminal B, through contacts 2AR—22, 2AH—23 and 1TR—108, and the winding of relay 2AAS to terminal O. Then when the train leaves section 1T, relay 1ES will become energized by its pick-up circuit. Similarly, when the train leaves section 3T, relay 3ES will become energized by its pick-up circuit. Relays 1LS and 3LS will now be energized by their pick-up circuits previously traced.

I shall now assume that, with section 5T occupied, the leverman decides to provide for a call-on traffic movement over the route governed by signals 2B, 6 and 10. He will, therefore, depress push button 2P as before, causing the pick-up and stick circuits to close for relays 1NE and 1RE as previously described. Through-route control relay 6Z will not now become energized, however, since its circuit is open at contact 5TR—57.

Relay 6XR, shown in Fig. 1d, will, however, become energized by a circuit passing from terminal B, through contact 1NE—109, back point of contact 110 of relay 6XS, winding of relay 6XR, and contacts 3NW—111 and 3RW—112 to terminal O. Relay 6XR, upon becoming energized, will complete its stick circuit which is the same as the pick-up circuit just traced except that it includes contact 113 of relay 6XR instead of contacts 3NW—111 and 3RW—112.

The leverman will now depress push button 6P to effect energization of relay 6XS by its pick-up circuit passing from terminal B, through contact 1NE—109, contact 114 of the circuit controller operated by push button 6P, winding of relay 6XS, and contacts 3NW—115 and 3RW—116 to terminal O. Relay 6XS, upon becoming energized, completes its stick circuit which is the same as the pick-up circuit just traced except that it includes the front point of contact 110 of relay 6XS instead of contact 114 of controller 6P and includes contact 6XS—117 instead of contacts 3NW—115 and 3RW—116.

As long as push button 6P remains depressed, relay 6XR will continue energized by a second stick circuit after relay 6XS picks up, the second stick circuit passing from terminal B, through contact 1NE—109, front point of contact 6XR—118, contact 119 of push button 6P, front point of contact 6XR—120, winding of relay 6XR, and contact 113 of relay 6XR to terminal O.

With relay 6XS energized, relay 1NW becomes energized by a second pick-up circuit passing from terminal B, through contact 6XS—121, winding of relay 1NW, and contacts 1RW—47 and 1RWK—48 to terminal O. Relay 1RE then becomes deenergized by the opening of contact 1NW—50.

In order to effect energization of relay 6PBS, the leverman will permit button 6P to return to the normal position to open, at contact 119 of button 6P, the second stick circuit traced for relay 6XR, causing relay 6XR to become deenergized. He will then again depress push button 6P, causing relay 6PBS to become energized by a pick-up circuit passing from terminal B, through contact 3TR—122, back point of contact 6XR—118, contact 119 of push button 6P, back point of contact 6XR—120, winding of relay 6PBS, and contacts 3NW—115 and 3RW—116, connected in multiple with contact 6XS—117, to terminal O. Relay 6PBS, upon becoming energized, will complete its stick circuit passing from terminal B, through contact 3TR—122, contact 123 of push button 6P, contact 124 of relay 6PBS, and contact 6PBS—125 to terminal O.

With relay 6PBS energized, relay 3NE Fig. 1e, will now be energized by a second circuit passing from terminal B, through contact 6PBS—126, winding of relay 3NE, and contacts 3RW—62 and 3RWK—63 to terminal O. Relay 3RE will now also be energized by a circuit passing from terminal B, through the front point of contact 6PBS—127, winding of relay 3RE, and contacts 3NW—128 and 3NWK—129 to terminal O. With relay 3NE energized, relay 10XR will become energized by a circuit passing from terminal B, through contact 3NE—130, back point of contact 131 of relay 10XS, winding of relay 10XR, and contacts 5NW—132 and 5RW—133 to terminal O. Relay 10XR, upon becoming energized, completes its own stick circuit which is the same as the pick-up circuit just traced except that it includes contact 134 of relay 10XR instead of contacts 5NW—132 and 5RW—133.

The leverman will now depress push button 10P for energizing relay 10XS by its pick-up circuits passing from terminal B, through contact 3NE—130, contact 135 of push button 10P, winding of relay 10XS, and contacts 5NW—136 and 5RW—137 to terminal O. Relay 10XS, upon becoming energized, completes its stick circuit passing from terminal B, through contact 3NE—130, front point of contact 131 of relay 10XS, winding of relay 10XS, and contact 10XS—138 to terminal O.

While push button 10P remains depressed, a second stick circuit is closed for relay 10XR, passing from terminal B, through contact 3NE—130, front point of contact 10XR—139, contact 140 of push button 10P, front point of contact 10XR—141, winding of relay 10XR, and contact 134 of relay 10XR to terminal O.

Relay 10XS, upon becoming energized, completes a second circuit for energizing relay 3NW, passing from terminal B, through contact 10XS—142, winding of relay 3NW, and contacts 3RW—62 and 3RWK—63 to terminal O. Relay 3NW, upon becoming energized, opens its contact 3NW—128 in the circuit previously traced for relay 3RE, causing relay 3RE to become deenergized. With relay 3NW energized, a third circuit becomes closed for energizing relay 3NE, this circuit passing from terminal B, through contacts 6AS—143, 1NE—144, 3NW—145, back point of contact 6Z—61, winding of relay 3NE, and contacts 3RW—62 and 3RWK—63 to terminal O.

In order to effect energization of relay 10PBS, the leverman will return button 10P to its normal position to deenergize relay 10XR, and will then again depress push button 10P for completing pick-up and stick circuits for relay 10PBS which are similar to the circuits previously traced for relay 6PBS. Relay 5NE will then become energized by a second circuit, passing from terminal B, through contact 10PBS—150, winding of relay 5NE, and contacts 5RW—65 and 5RWK—66 to terminal O. Relay 5RE will also be energized by a circuit passing from terminal B, through the front point of contact 10PBS—151, winding of relay 5RE, and contacts 5NW—152 and 5NWK—153 to terminal O.

The leverman will now depress push button 14P, thereby completing a pick-up circuit for relay 14XS which is the same as the pick-up circuit previously traced for this relay except that it includes contact 5TP—146 instead of contact 5TR—67. Relay 5NW will then become energized as previously described. Relay 5NW, upon becoming energized, opens its contact 5NW—152, thereby deenergizing relay 5RE.

With relay 6XS energized, route agreement relay 2BR, shown in Fig. 1h, will be energized by a circuit passing from terminal B, through the front point of contact 6XS—93, contact 1NWK—94, back point of contact 2XS—95, front point of contact 6XS—96, and winding of relay 2BR to terminal O. With relays 10XS and 6PBS energized, route agreement relay 6R is energized by a circuit passing from terminal B, through the front point of contact 10XS—90, contact 3NWK—91, front point of contact 6PBS—92, and the winding of relay 6R to terminal O. With relays 14XS and 10PBS energized, route agreement relay 10R will be energized by a circuit passing from terminal B, through the front point of contact 14XS—87, contact 5NWK—88, front point of contact 10PBS—89, and the winding of relay 10R to terminal O.

It follows that, in order to arrange the through route governed by signal 2A, each of the push buttons 2P and 14P is depressed once, and that in order to arrange for a call-on traffic movement over this route, each of the push buttons 6P and 10P is depressed twice in addition to the single operation of push buttons 2P and 14P. The following tabulation shows the operation of the push buttons for arranging this route for through traffic movements and for call-on traffic movements, and also shows the operation of the push buttons for arranging the other possible eastbound routes.

| Route | Operation of Push Buttons |
| --- | --- |
| Through route governed by 2A | 2P, 14P. |
| Call-on movement over this route | 2P, 6P, 6P, 10P, 10P, 14P. |
| Route over switch 1 reversed | 2P, 4P. |
| Route over switch 3 reversed | 2P, 6P, 6P, 8P. |
| Route over switch 5 reversed | 2P, 6P, 6P, 10P, 10P, 12P. |

From the foregoing description of the operation of the apparatus for arranging a through route governed by signal 2A and including switches 1, 3 and 5 in their normal positions, and for arranging for a call-on traffic movement over this route governed by signals 2B, 6 and 10, it is believed that the operation of the apparatus for any other possible traffic movement can be readily traced.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In interlocking control apparatus including a manual control device for each route end of a plurality of interconnected railway track routes, in which energization of a preliminary route selector for each route including a switch selector relay for each switch of the route for the position in which the switch is included in the route is effected by operation of the manual control device for the entrance end of the route, in which energization of an exit stick relay for each route is effected by operation of the manual control device for the exit end of the route while the preliminary route selector for the same route is energized, the combination comprising, a final route selector for each route each including a second switch selector relay for each switch of the route for the position in which the switch is included in the route, a pick-up circuit for the second switch selector relay for the last switch in each route controlled by a front contact of the exit stick relay for that route in series with a front contact of the first switch selector relay for that switch, and a stick circuit for the second switch selector relay for the last switch in each route controlled by the manual control device for the exit end of the route in its normal position.

2. In interlocking control apparatus including a manual control device for each route end of a plurality of interconnected railway track routes, in which energization of a preliminary route selector for each route including a switch selector relay for each switch of the route for the position in which the switch is included in the route is effected by operation of the manual control device for the entrance end of the route, in which energization of an exit stick relay for each route is effected by operation of the manual control device for the exit end of the route while the preliminary route selector for the same route is energized, the combination comprising, a final route selector for each route each including a second switch selector relay for each switch of the route for the position in which the switch is included in the route, an energizing circuit for the second switch selector relay for the last switch in each route controlled by a front contact of the exit stick relay for that route in series with a front contact of the first switch selector relay for that switch, and two stick circuits for each exit stick relay one of which is controlled by a front contact of the first switch selector relay for a switch in its route and the other of which is controlled by a front contact of the second switch selector relay for the same switch in its route.

3. In interlocking control apparatus including a manual control device for each route end of a plurality of interconnected railway track routes, in which energization of a preliminary route selector for each route including a switch selector relay for each switch of the route for the position in which the switch is included in the route is effected by operation of the manual control device for the entrance end of the route, in which energization of an exit stick relay for each route is effected by operation of the manual control device for the exit end of the route while the preliminary route selector for the same route is energized, the combination comprising, a final route selector for each route each including a second switch selector relay for each switch of the route for the position in which the switch is included in the route, an energizing circuit for the second switch selector relay for the last switch in each route controlled by a front contact of the exit stick relay for that route, and two stick circuits for each exit stick relay one of which is controlled by a front contact of the first switch selector relay for a switch in its route and the other of which is controlled by a front contact of the second switch selector relay for the same switch in its route.

4. In interlocking control apparatus including a manual control device for each route end of a plurality of interconnected railway track routes, in which energization of a preliminary route selector for each route including a switch selector relay for each switch of the route for the position in which the switch is included in the route is effected by operation of the manual control device for the entrance end of the route, in which energization of an exit stick relay for each route is effected by operation of the manual control device for the exit end of the route while the preliminary route selector for the same route is energized, the combination comprising, a final route selector for each route each including a second switch selector relay for each switch of the route for the position in which the switch is included in the route, means responsive to energization of the exit stick relay for each route for effecting energization of the second switch selector relay for each switch of the same route, and two stick circuits for each exit stick relay one of which is controlled by a front contact of the first switch selector relay for a switch in its route and the other of which is controlled by a front contact of the second switch selector relay for the same switch in its route.

5. In interlocking control apparatus including a manual control device for each route end of a plurality of interconnected railway track routes, in which energization of a preliminary route selector for each route including a switch selector relay for each switch of the route for the position in which the switch is included in the route is effected by operation of the manual control device for the entrance end of the route, in which energization of an exit stick relay for each route is effected by operation of the manual control device for the exit end of the route while the preliminary route selector for the same route is energized, the combination comprising, a final route selector for each route each including a second switch selector relay for each switch of the route for the position in which the switch is included in the route, means responsive to energization of the exit stick relay for each route for effecting energization of the second switch selector relay for each switch of the same route, and normal and reverse control means controlled by the first and second switch selector relays for each switch for effecting operations to normal and reverse positions respectively required for the corresponding switch for each direction of traffic movements.

6. In interlocking control apparatus including a manual control device for each route end of a plurality of interconnected railway track routes, in which energization of a preliminary route selector for each route including a switch selector relay for each switch of the route for the position in which the switch is included in the route is effected by operation of the manual control device for the entrance end of the route, in which energization of an exit stick relay for each route is effected by operation of the manual control device for the exit end of the route while the preliminary route selector for the same route is energized, the combination comprising, a final route selector for each route each including a second switch selector relay for each switch of the route for the position in which the switch is included in the route, means responsive to energization of the exit stick relay for each route for effecting energization of the second switch selector relay for each switch of the same route, and a normal and a reverse control relay for each switch each controlled by the corresponding first and second switch selector relays for effecting all operations to normal and reverse positions respectively required for the corresponding switch for each direction of traffic movements.

7. In interlocking control apparatus including a manual control device for each route end of a plurality of interconnected railway track routes, in which energization of a preliminary route selector for each route including a switch selector relay for each switch of the route for the position in which the switch is included in the route is effected by operation of the manual control device for the entrance end of the route, in which energization of an exit stick relay for each route is effected by operation of the manual control device for the exit end of the route while the preliminary route selector for the same route is energized, the combination comprising, a final route selector for each route each including a second switch selector relay for each switch of the route for the position in which the switch is included in the route, means responsive to energization of the exit stick relay for each route for effecting energization of the second switch selector relay for each switch of the same route, and a normal and a reverse control relay for each switch each having a pick-up circuit controlled by front contacts of the first and second switch selector relays for the normal or reverse position respectively of its switch for each direction of traffic movements, and each having a stick circuit controlled by a back contact of a locking relay for its switch.

8. In interlocking control apparatus including a manual control device for each route end of a plurality of interconnected railway track routes, in which energization of a preliminary route selector for each route including a switch selector relay for each switch of the route for the position in which the switch is included in the route is effected by operation of the manual control device for the entrance end of the route, in which energization of an exit stick relay for each route is effected by operation of the manual control device for the exit end of the route while the preliminary route selector for the same route is energized, the combination comprising, a final route selector for each route each including a second switch selector relay for each switch of the route for the position in which the switch is included in the route, means responsive to energization of the exit stick relay for each route for effecting energization of the second switch selector relay for each switch of the same route, a normal and a reverse control relay for each switch each controlled by the corresponding first and second switch selector relays for the normal or reverse position respectively for its switch, for each direction of traffic movements a normal and a reverse repeater relay for each switch each energized according as the corresponding switch is controlled to occupy the normal or the reverse position respectively, a normal indication relay for each switch controlled by the normal control and repeater relays for its switch, and a reverse indication relay for each switch controlled by the reverse control and repeater relays for its switch.

9. In interlocking control apparatus including a manual control device for each route end of a plurality of interconnected railway track routes, in which energization of a preliminary route selector for each route including a switch selector relay for each switch of the route for the position in which the switch is included in the route is effected by operation of the manual control device for the entrance end of the route, in which energization of an exit stick relay for each route is effected by operation of the manual control device for the exist end of the route while the preliminary route selector for the same route is energized, the combination comprising, a final route selector for each route each including a second switch selector relay for each switch of the route for the position in which the switch is included in the route, means responsive to energization of the exit stick relay for each route for effecting energization of the second switch selector relay for each switch of the same route, two stick circuits for each exit stick relay one of which is controlled by a front contact of the first switch selector relay for a switch in its route and the other of which is controlled by a front contact of the second switch selector relay for the same switch in its route, a plurality of route agreement relays one for each route, and a control circuit for each route agreement relay controlled by a front contact of the exit stick relay for its route and by a back contact of the exit stick relay for the corresponding route for the opposite direction of traffic movements.

10. In interlocking control apparatus including a manual control device for each route end of a plurality of interconnected railway track routes, in which energization of a preliminary route selector for each route including a switch selector relay for each switch of the route for the position in which the switch is included in the route is effected by operation of the manual control device for the entrance end of the route, in which energization of an exit stick relay for each route is effected by operation of the manual control device for the exit end of the route while the preliminary route selector for the same route is energized, the combination comprising, a final route selector for each route each including a second switch selector relay for each switch of the route for the position in which the switch is included in the route, means responsive to energization of the exit stick relay for each route for effecting energization of the second switch selector relay for each switch of the same route, and means responsive to energization of the first and second switch selector relays for each switch for each route for effecting operation of the corresponding switch to the position required for the corresponding route for each direction of traffic movements.

11. In interlocking control apparatus including a manual control device for each route end of a plurality of interconnected railway track routes, in which a through traffic signal is provided for governing traffic movements over a through route including a plurality of intermediate routes in series while the signals for said intermediate routes are indicating stop, in which energization of a preliminary route selector for each route including a switch selector relay for each switch of the route is effected by operation of the manual control device for the entrance end of the route, in which energization of an exit stick relay and a final route selector for each route including a second switch selector relay for each switch of the route is effected by operation of the manual control device for the exit end of the route while the preliminary route selector for the same route is energized, the combination comprising, a through traffic relay controlled by a front contact of the first switch selector relay for the first switch and by a back contact of the exit stick relay for the first intermediate route in said series if all of said intermediate routes are unoccupied, means controlled by said through traffic relay for energizing the rest of said first switch selector relays for said through route, and means controlled by operation of the manual control device for the exit end of the last intermediate route in said series for effecting energization of a final route selector including all of said second switch selector relays for said through route and for clearing said through traffic signal if all of said first and second switch selector relays for said through route have become energized.

12. In interlocking control apparatus including a manual control device for each route end of a plurality of interconnected railway track routes, in which a through traffic signal is provided for governing traffic movements over a through route including a plurality of intermediate routes in series while the signals for said intermediate routes are indicating stop, the combination comprising, a route selector for said through route including a switch selector relay for each switch of said through route, means controlled by traffic conditions on said through route and by operation of the manual control device for the entrance end of the first of said intermediate routes for energizing said route selector only if said through route is unoccupied, means controlled by said route selector in its energized condition and by operation of the manual control device for the exit end of the last of said intermediate routes for arranging all the switches of said intermediate routes in the position required for said through route and for clearing said through traffic signal only if said through route is unoccupied, and means controlled by one operation of the manual control device for the entrance end of the first of said intermediate routes and of the manual control device for the exit end of the last of said intermediate routes and controlled by two operations of each of the other manual control devices for said intermediate routes for arranging the switches in the position required for said through route and clearing a signal for each of said intermediate routes while said through traffic signal indicates stop.

13. In interlocking control apparatus including a manual control device for each route end of a plurality of interconnected railway track routes, including a preliminary route selector and a final route selector and also a main exit stick relay for each route, the combination comprising, means controlled by operation of the manual control device of the entrance end of the first of a plurality of successive routes for effecting energization of the preliminary route selector for said first route, an auxiliary exit stick relay and an intermediate route stick relay for each of said plurality of successive routes except the last one, means controlled by energization of the preliminary route selector for each route for energizing the auxiliary exit stick relay for its route if its main exit stick relay is deenergized, means controlled by operation of the manual control device for the exit end of each route for energizing the main exit stick relay for the same route if its preliminary route selector is energized, means controlled by a second operation of the manual control device for the exit end of each route and by the auxiliary exit stick relay for the same route for energizing the intermediate route stick relay for its route if the auxiliary exit stick relay for the same route is deenergized, means controlled by energization of each intermediate route stick relay for energizing the preliminary route selector for the next route, means controlled by energization of each main exit stick relay for energizing the final route selector for its route, means controlled by the preliminary and final route selectors independently of the main exit stick relays for effecting operation of the switches to the positions required by said routes for each direction of traffic movements and means controlled by the main exit stick relays for effecting the clearing of the signals for said routes.

14. In interlocking control apparatus including a manual control device for each route end of a plurality of interconnected railway track routes, in which a through traffic signal is provided for governing traffic movements over a through route including a plurality of intermediate routes in series while the signals for said intermediate routes are indicating stop, and including a preliminary route selector and a final route selector and also a main exit stick relay for each of said intermediate routes, the combination comprising, an auxiliary exit stick relay and an intermediate route stick relay for each of said intermediate routes except the last one in said series, means controlled by operation of the manual control device for the entrance end of said first intermediate route for energizing the preliminary route selector for said first intermediate route, means controlled by the preliminary route selector for each intermediate route independently of the manual control device for the exit end of the same intermediate route for energizing the auxiliary exit stick relay for its intermediate route if its main exit stick relay is deenergized, means controlled by operation of the manual control device for the exit end of each route for energizing its main exit stick relay if its preliminary route selector is energized, means controlled by a second operation of the manual control device for the exit end of each intermediate route except the last one for energizing its intermediate route stick relay, means controlled by each intermediate route stick relay for energizing the preliminary route selector for the next succeeding route, means controlled by each exit stick relay for energizing the final route selector for operating the switches and clearing the signal for its route, and means controlled by operation of only the manual control device for the entrance end of the first route and the manual control device for the exit end of the last route for effecting energization of the preliminary and final route selectors for arranging said through route and clearing said through traffic signal.

15. In interlocking control apparatus for a plurality of railway track routes including a first and a second route arranged end to end with the exit end of the first route adjoining the entrance end of the second route, including a first manual control device for the entrance end of said first route and a second manual control device for the exit end of said first route and the entrance end of said second route and also a third manual control device for the exit end of said second route, including a preliminary route selector relay and a final route selector relay for each of said routes, the combination comprising, a main exit stick relay and an auxiliary exit stick relay and also an intermediate route stick relay for said first route, means controlled by operation of said first manual control device for energizing the preliminary route selector relay for said first route, means controlled by energization of said preliminary route selector relay for said first route independently of the manual control device for the exit end of said first route for energizing said auxiliary exit stick relay if said main exit stick relay is deenergized, means controlled by operation of said second manual control device for energizing said main exit stick relay if said preliminary route selector relay for said first route is energized, means controlled by a second operation of said second manual control device and by the auxiliary exit stick relay for the same route for energizing said intermediate route stick relay if said auxliary exit stick relay is deenergized, means controlled by said intermediate route stick relay for energizing said preliminary route selector relay for said second route, and means controlled by operation of said third manual control device while the preliminary route selector relay for said second route is energized for energizing the final route selector relays for said first and second routes for arranging the switches and clearing the signals for said routes.

16. In interlocking control apparatus including a manual control device for each route end of a plurality of interconnected railway track routes, in which a through traffic signal is provided for governing traffic movements over a through route including a plurality of intermediate routes in series while the signals for said intermediate routes are indicating stop, the combination comprising, a main exit stick relay for each of said intermediate routes, an auxiliary exit stick relay and an intermediate route stick relay for each of said intermediate routes except the last one, means controlled by operation of the manual control device for the entrance end of each of said intermediate routes except the last one for energizing its auxiliary exit stick relay if its main exit stick relay is deenergized, means controlled by operation of the manual control device for the exit end after operation of the manual control device for the entrance end of each of said intermediate routes for energizing its main exit stick relay, means controlled by a second operation of the manual control device for the exit end of each of said intermediate routes except the last one and by the auxiliary exit stick relay for the same route for energizing its intermediate route stick relay if its auxiliary exit stick relay is deenergized, means controlled by said intermediate route stick relays and by said main exit stick relays for clearing signals for said intermediate routes, and means controlled by operation of only the manual control device for the entrance end of the first route of said series and the manual control device for the exit end of the last route of said series for clearing said through traffic signal.

17. In interlocking control apparatus for a plurality of railway track routes including a first and a second route arranged end to end with the exit end of the first route adjoining the entrance end of the second route, including a first manual control device for the entrance end of said first route and a second manual control device for the exit end of said first route and the entrance end of said second route and also a third manual control device for the exit end of said second route, the combination comprising, a main exit stick relay and an auxiliary exit stick relay and also an intermediate route stick relay for said first route, an exit stick relay for said second route, means controlled by operation of said first manual control device independently of said second manual control device for energizing said auxiliary exit stick relay, means controlled by operation of said second manual control device after operation of said first manual control device for energizing said main exit stick relay, means controlled by said auxiliary exit stick relay and by a second operation of said second manual control device for energizing said intermediate route stick relay if said auxiliary exit stick relay is deenergized, means controlled by a front contact of said intermediate route stick relay and by operation of said third manual control device for energizing said exit stick relay for said second route, a signal for said first route controlled by a front contact of said main exit stick relay, and a second signal for said second route controlled by said intermediate route stick relay and by the exit stick relay for said second route.

18. In interlocking control apparatus for a plurality of railway track routes including a first and a second route arranged end to end with the exit end of the first route adjoining the entrance end of the second route, including a first manual control device for the entrance end of said first route and a second manual control device for the exit end of said first route and the entrance end of said second route and also a third manual control device for the exit end of said second route, including a first and a second signal for governing traffic movements in a given direction over said first and second routes respectively, including a through traffic signal for governing traffic movements in said given direction over both of said routes while said first and second signals indicate stop, the combination comprising, a through-route control relay, a main exit stick relay and an auxiliary exit stick relay and also an intermediate route stick relay for said first route, an exit stick relay for said second route, means controlled by operation of said first manual control device independently of said second manual control device for energizing said auxiliary exit stick relay, means controlled by operation of said second manual control device after operation of said first manual control device for energizing said main exit stick relay, means controlled by said auxiliary exit stick relay and by a second operation of said second manual control device for energizing said intermediate route stick relay if said auxiliary exit stick relay is deenergized, means controlled by a front contact of said intermediate route stick relay and by operation of said third manual control device for energizing said exit stick relay for said second route, means controlled by a front contact of said main exit stick relay for controlling said first signal, means controlled by a front contact of said intermediate route stick relay and by a front contact of said exit stick relay for said second route for controlling said second signal, means controlled by operation of said first manual control device while said main exit stick relay is deenergized for energizing said through-route control relay, means controlled by a front contact of said through-route control relay and by operation of said third manual control device for energizing said exit stick relay for said second route, and means controlled by a front contact of said exit stick relay for said second route and by a back contact of said main exit stick relay for controlling said through traffic signal.

RONALD A. McCANN.

REFERENCES CITED

The following references are of record in the file of this patent:

UNITED STATES PATENTS

| Number | Name | Date |
| --- | --- | --- |
| 2,300,272 | Young | Oct. 27, 1942 |
| 2,301,297 | Lewis | Nov. 10, 1942 |
| 2,315,864 | Lewis | Apr. 6, 1943 |